INVENTORS.
RAYMOND A. BEEBE
BY   JOHN R. JONES

Tweedale & Gerhardt
ATTORNEYS.

INVENTORS.
RAYMOND A. BEEBE
BY  JOHN R. JONES

Tweedale & Gerhardt
ATTORNEYS.

United States Patent Office 3,486,659
Patented Dec. 30, 1969

3,486,659
SHELLED PEANUT PLANTING APPARATUS
Raymond A. Beebe, Detroit, and John R. Jones, Westland, Mich., assignors to Massey-Ferguson Inc., Detroit, Mich.
Filed Oct. 30, 1967, Ser. No. 678,877
Int. Cl. B65g *59/06;* B65h *3/42*
U.S. Cl. 221—277                                    8 Claims

ABSTRACT OF THE DISCLOSURE

Planting apparatus including a cover plate for a hopper bottom formed with a circular disecharge passage. A rotary distributor beneath the cover plate carries seeds from the hopper through the discharge passage at a controlled rate for discharge onto the ground through a discharge tube.

BACKGROUND OF THE INVENTION

Field of the invention

The invention relates to apparatus for dispensing seeds from a hopper at a substantially uniform rate, and is particularly concerned with such apparatus that is suitable for planting shelled peanuts.

Description of the prior art

Various mechanisms have been employed in the prior art for obtaining a uniform feed of seeds and similar particulate material from a hopper by means of a rotary discharge device. In some prior mechanisms, the material is guided along a spiral path to a discharge point or opening such that the particulate material is fed from the discharge point in a steady stream at a more or less uniform rate. Examples of such mechanism are disclosed in U.S. Patents 746,410; 2,065,319 and 3,251,513.

SUMMARY OF THE INVENTION

Seed planting mechanism according to the present invention includes a cover plate mounted over the drive assembly of a conventional hopper. The cover plate is formed with a circular discharge passage having an open bottom. A tunnel formed on the cover plate partially covers the discharge passage. The outlet end of the discharge chute communicates with a discharge tube through which seeds fall to the ground. Mounted beneath the cover plate is a rotary distributor having a flat, horizontal central portion with a downwardly sloping, peripheral skirt portion. The distributor projects beneath the discharge passage such that seeds are carried from the hopper by the distributor through the discharge passage to the discharge tube. The side walls of the discharge passage confine and guide the seeds to the discharge tube at a rate determined by the speed of the distributor.

DRAWINGS

Figure 1:
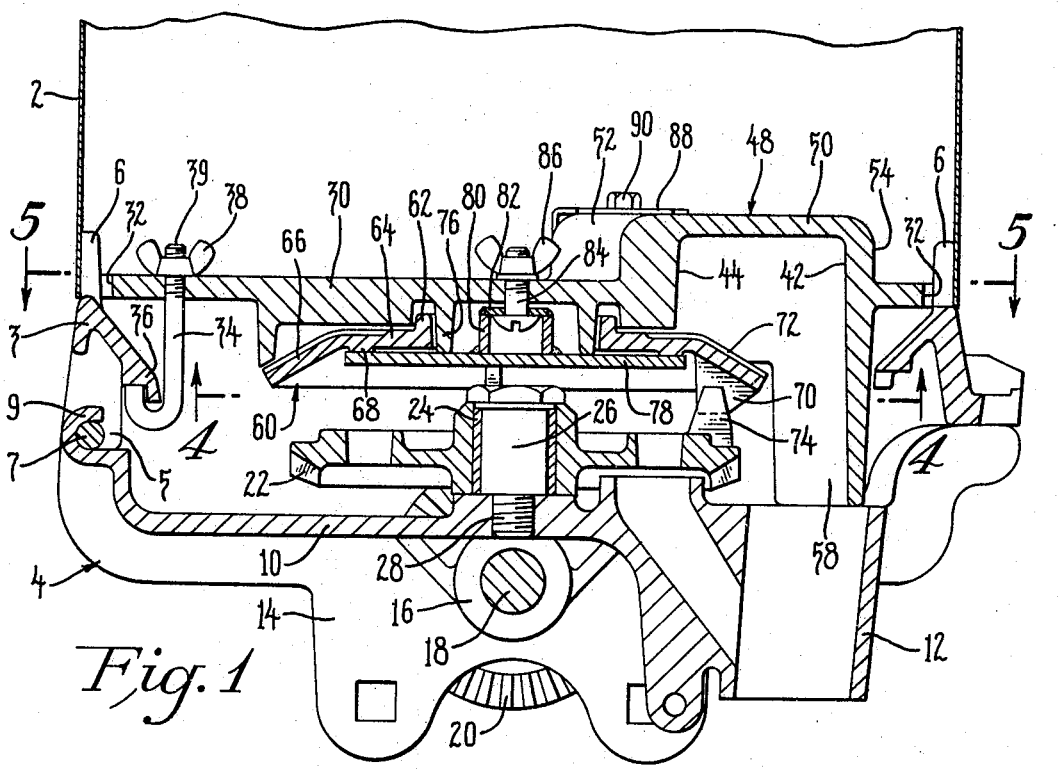
FIG. 1 is a sectional view of a shelled peanut planting mechanism embodying the invention.
Figure 2:
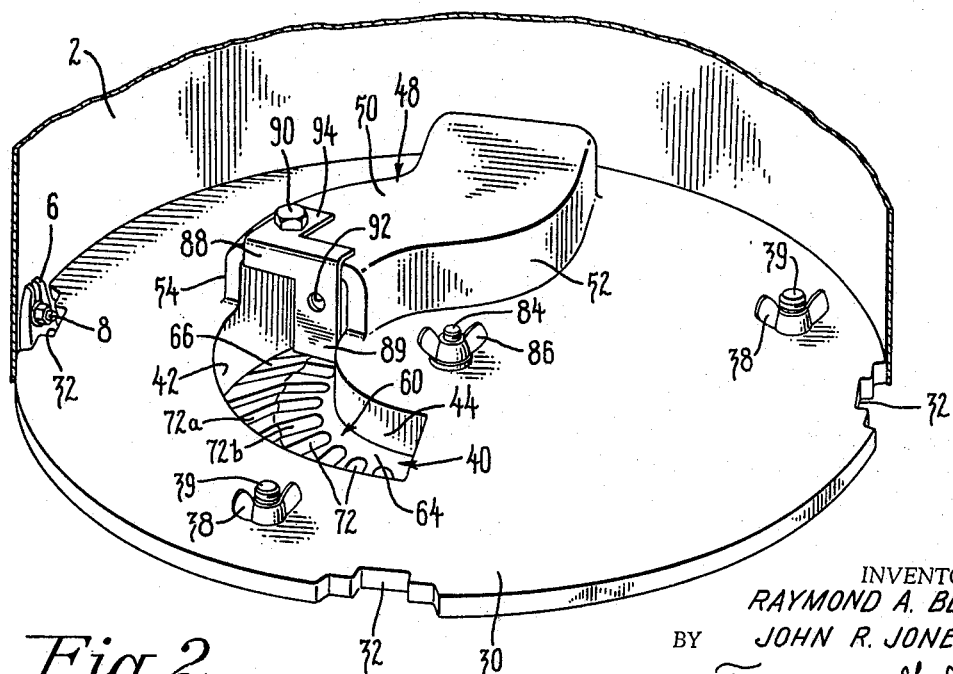
FIG. 2 is a top perspective view of the cover plate with the distributor shown through the discharge opening.
Figure 3:
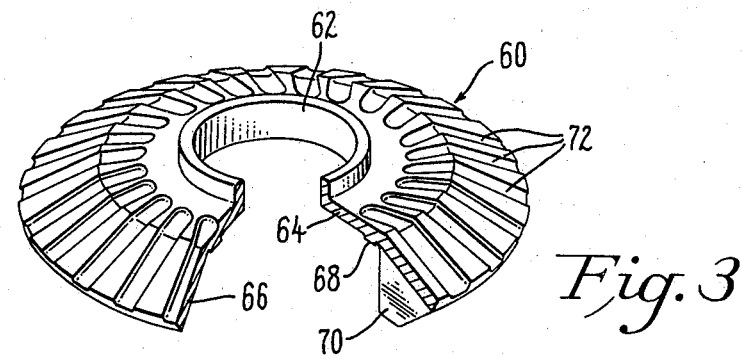
FIG. 3 is a perspective view, partially in section, of the rotary distributor.

In FIGS. 1 and 2, reference numeral 2 designates a hopper having a mounting ring 3 with support arms 6 connected with the hopper wall by means of conventional fasteners 8. Pins 7 are mounted in the lower end portion 5 of arms 6 for supporting the hooked portion 9 of a gear support assembly 4 having a seed discharge tube 12 formed thereon. A downwardly depending mounting flange 14 is formed with a bearing 16 for the shaft 18 of an input gear 20. The input gear 20 is engaged with a beveled drive gear 22 rotatably mounted on a bushing 24 received on a bearing 26 having a threaded stem 28 mounted on a horizontal support arm 10.

Fitted onto the bottom of the hopper and overlying drive assembly 4 is a closure or cover plate 30 formed with notches 32 for receiving the upwardly projecting arms 6. Hooks 34 are engaged with a flange 36 formed on the mounting ring 3 and have threaded stems 39 which pass through openings in cover plate 30 to receive wing nuts 38 and secure the cover plate in position over the gear support assembly 4.

Figure 4:
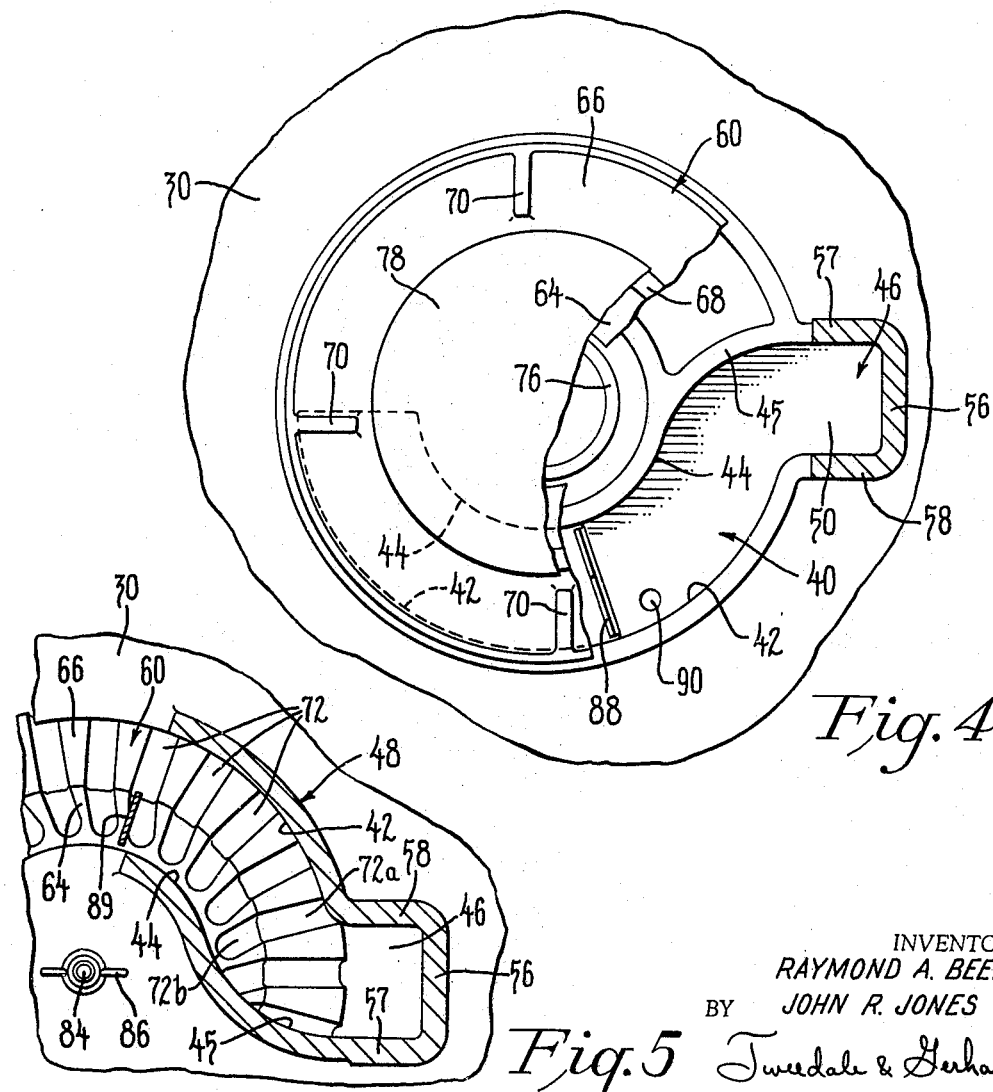
FIG. 4 is a bottom view taken along lines 4—4 of FIG. 1.

The cover plate 30 is formed with a circular, open bottom discharge passage 40 having an outer side wall 42 and an inner side wall 44 having a reverse curved portion 45 (FIG. 4) adjacent the outlet end 46 of passage 40. Passage 40 is partially covered by a tunnel 48 having a top wall 50, an inner side wall 52, and an outer side wall 54. Tunnel 48 terminates at an end wall 56, which, together with depending extensions 57 and 58 at the ends of side walls 44 and 42, respectively, connect the outlet end of ithe tunnel and discharge passage with the discharge tube 12 (FIG. 1).

Rotatably mounted beneath cover plate 30 is a rotary distributor or dispensing plate 60 which includes a central hub portion 62, a flat, horizontal, circular, central portion 64 and a downwardly and outwardly sloping skirt portion 66 at its periphery. A bearing ring or projection 68 is formed on the bottom surface of the horizontal central portion 64. A plurality, in this instance 4, or drive lugs 70 project downwardly from the bottom surface of the skirt portion 66.

The distributor 60 is mounted on a support disc 78 with its hub portion concentrically mounted over a hollow, cylindrical boss 76 projecting downwardly from beneath the cover plate 30. The bearing ring 68 supports the distributor on the disc 78 and the hub portion 62 loosely receives the boss 76. The disc 78 has welded to its upper surface a ring 80 on which is welded a cap 82 having a central aperture. Mounted in the opening is a screw 84 with its shank projecting through a central opening in cover plate 30 and is secured to the cover plate by a wing nut 86. Drive lugs 70 are engaged with driving teeth 74 projecting upwardly from the drive gear 22 so that rotation of the drive gear 22 causes corresponding rotation of distributor 66 relative to the support disc 78 and cover plate 30. The distributor 60 has a plurality of grooves or flutes 72 formed in its upper surface, which flutes begin at substantially the mid portion of the flat portion 64 and terminate at the peripheral edge of the sloping skirt portion 66.

With reference to FIG. 2, a metering plate 88 is mounted by a screw 90 over the inlet opening of tunnel 48 and has a metering flange 89 partially covering the inlet end of tunnel 48. Screw 90 passes through an opening formed in a flange 94 similar to the metering flange 89. The metering flange 89 is formed with an opening 92 so that the position of the flanges 89 and 94 may be reversed to accommodate different size seeds. As shown in FIG. 2, the fluted portion of the flat portion 64 as well as the skirt portion 66 closes the open bottom of the discharge passage 40. Moreover, the side wall 42 projects downwardly a greater distance below the upper surface of plate 30 than does the side wall 44 to confine seeds on the skirt portion of the distributor.

Figure 5:
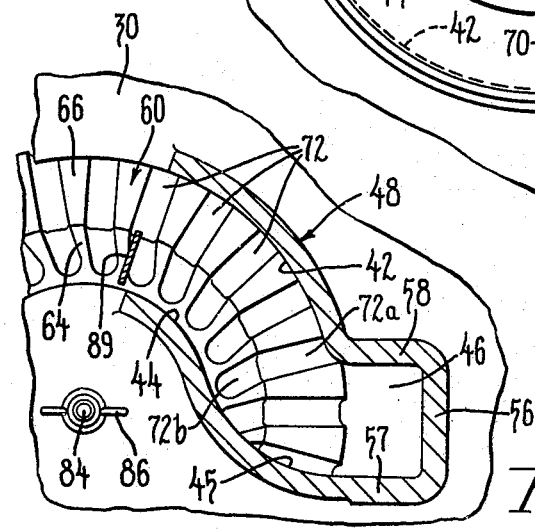
FIG. 5 is a view taken along lines 5—5 of FIG. 1.

In operation, shelled peanuts within the hopper 2 pass into the discharge passage 40 where they are received on the portions 64 and 66 of the distributor 60. The distributor 60 is driven to rotate in the direction to carry the seeds through the tunnel 48 to the outlet end 46 where the seeds fall through the discharge tube 12. The metering plate 89 controls the rate of entry of seeds into tunnel 48 in accordance with the size of the peanuts. The rate at which the seeds fall through the discharge tube 12 is determined by the rotary speed of distributor 60. As shown particularly in FIG. 5, the skirt portion 72a of grooves 72 extend radially, while the portion 72b assist in guiding seeds around wall portion 45 into outlet 46.

While a specific form of the invention has been illustrated and described in the foregoing specification and accompanying drawings, it should be understood that the invention is not limited to the exact construction shown, but that various alterations in the construction and arrangement of parts is possible without departing from the scope and spirit of the invention.

What is claimed is:

1. Planting apparatus including a hopper having a drive support assembly; a discharge tube; a cover plate mounted in the hopper over the drive support assembly; a circular open-bottom discharge passage formed in the cover plate; a tunnel formed on said cover plate partially covering the discharge passage and having an outlet end communicating with said discharge tube; a truncated cone forming a rotary distributor mounted beneath said cover plate having a flat central portion and a downwardly and outwardly sloping skirt portion at the periphery of the central portion; said rotary distributor projecting beneath the discharge passage, a plurality of generally radially extending grooves formed in the upper surfaces of the rotary dispensing plate, which extend over a portion of the horizontal central portion and terminate at the periphery of the skirt portion, for agitating seeds in the discharge passage, and drive means mounted on the drive support assembly for rotating the rotary distributor in a direction to carry seeds from the hopper through the discharge passage and tunnel to the discharge tube.

2. Planting apparatus as claimed in claim 1 wherein said discharge passage has a pair of depending inner and outer side walls; and wherein the central, flat portion of the rotary distributor projects beneath the lower edge of the inner wall and wherein the skirt portion projects beneath the lower edge of the outer wall, the lower edge of said outer wall extending below the lower edge of the inner wall so that seeds are confined onto the skirt portion of the rotary distributor by said outer wall in the circular discharge passage.

3. Planting apparatus as claimed in claim 2 wherein said rotary distributor includes a hub portion formed in the central, flat portion; and further including a hollow, cylindrical boss projecting downwardly from the lower surface of the cover plate and loosely received within the hub portion of the rotary distributor; and support means cooperating with said hollow cylindrical boss to support the rotary distributor in the cover plate.

4. Planting apparatus as claimed in claim 3 wherein said support means comprises a disc, a ring member having one end mounted on the upper surface of said disc at the center thereof, an apertured cap member secured to the other end of the ring member, a screw received in the ring member having a threaded stem projecting through the apertured cap member, a hole in the cover plate for receiving said stem, and a nut threadedly mounted on the stem of the screw to hold the cover plate, rotary distributor, and disc in assembled relationship.

5. Planting apparatus as claimed in claim 4 further including a bearing ring projecting from the lower surface of the rotary distributor for supporting the rotary distributor on the disc.

6. Planting apparatus as claimed in claim 5 further including a vertical mounting flange and a support arm formed on the drive support assembly, and wherein said drive means includes an input gear rotatably mounted on the mounting flange and a drive gear rotatably mounted on the horizontal support arm beneath the rotary distributor in driving engagement with the input gear.

7. Planting apparatus as claimed in claim 6 further including at least one driving tooth projecting from said drive gear and at least one driven lug projecting from beneath said rotary distributor into the path of said driving tooth so that rotation of said drive gear causes rotation of the rotary distributor.

8. Planting apparatus as claimed in claim 1 wherein the position of the grooves on the horizontal central portion of the distributor extend at an angle from the radial direction.

References Cited

UNITED STATES PATENTS

| | | | |
|---|---|---|---|
| 488,650 | 12/1892 | Dodd | 222—367 X |
| 575,174 | 1/1897 | Schiff | 222—345 |
| 897,220 | 8/1908 | Michael | 222—347 X |
| 1,562,152 | 11/1925 | DuGrenier | 221—263 |
| 2,685,988 | 8/1954 | Nelson et al. | 222—351 X |
| 2,690,856 | 10/1954 | Trondle | 221—277 X |

SAMUEL F. COLEMAN, Primary Examiner